United States Patent

Harris

[15] 3,644,845

[45] Feb. 22, 1972

[54] FREQUENCY STABILIZATION METHOD AND APPARATUS FOR PARAMETRIC AMPLIFIERS AND OSCILLATORS

[72] Inventor: Stephen E. Harris, 880 Richardson Court, Palo Alto, Calif. 94303

[22] Filed: June 6, 1969

[21] Appl. No.: 831,114

[52] U.S. Cl. ..............................331/175, 307/88.3, 330/4.5, 331/107

[51] Int. Cl. ..............................H03f 7/00

[58] Field of Search ..............................307/88.3; 331/107, 175

*Primary Examiner*—Roy Lake

*Assistant Examiner*—Darwin R. Hostetter

*Attorney*—Flehr, Hohbach, Test, Albritton & Herbert

[57] ABSTRACT

A coherent radiation beam passes in series through a pair of nonlinear elements separated by a modifying element, the nonlinear elements are reversed with respect to each other so that the effect of the beam in passing through the first is cancelled or nullified by the second. The modifying element serves to absorb and shift the phase of a selected frequency band such that cancellation of that band by the second element is prevented and selective amplification of the modified frequency band is achieved.

8 Claims, 7 Drawing Figures

INVENTOR
STEPHEN E. HARRIS
BY
*Flehr, Hohbach, Test, Albritton & Herbert*
ATTORNEYS INVENTOR.
STEPHEN E. HARRIS
BY Flehr, Hohbach, Test, Albritton & Herbert
ATTORNEYS INVENTOR.
STEPHEN E. HARRIS
BY
Flehr, Hohbach, Test, Albritton & Herbert
ATTORNEYS

FREQUENCY STABILIZATION METHOD AND APPARATUS FOR PARAMETRIC AMPLIFIERS AND OSCILLATORS

The present invention relates to parametric oscillators and amplifiers and more particularly to a method and apparatus for stabilizing or locking the output frequency of such oscillators and amplifiers within a well-defined frequency range.

Parametric amplifiers and oscillators are known and commonly use a pump source of coherent radiation which generates signal and idler frequencies in a nonlinear medium. Continuous wave forms of such parametric oscillators for the visible spectrum have, for example, used a laser output as a pump to generate a tunable light output signal and an infrared idler within a suitable nonlinear crystal. In that system, the general conditions for a parametric amplifier must be satisfied and include the condition that the signal frequency plus the idler frequency equals the pump frequency:

$$\omega_p = \omega_s + \omega_i \qquad 1.$$

Furthermore, a momentum matching condition is also required in order that the effect be cumulative to provide amplification. This condition can be expressed as: the momentum vector of the signal plus the momentum vector of the idler must approximately equal the momentum vector of the pump, $$\bar{k}_p \cong \bar{k}_s + \bar{k}_i \qquad 2.$$

For the collinear case, the equation (2) can be written in the form $$\eta_s \omega_s + \eta_i \omega_i = \eta_p \omega_p \qquad 3.$$

where $\eta$ refers to the respective refractive indices. Common methods of tuning such amplifiers include temperature control, the application of electric fields, or by changing the relative angles of the pump, signal and idler. It is found that for a given set of refractive indices there will be a unique signal and idler frequency which equals the pump frequency and for which the matching condition holds. Amplification then can take place. An oscillator form of parametric device in the visible utilizes mirrors forming an optical cavity about the nonlinear crystal to supply feedback at either the signal or idler frequencies or both so that the system develops a coherent oscillation at the signal and idler frequencies.

In the practical application of such devices, it is often desired to know what the line width of the parametric oscillator will be, or, if an amplifier, its bandwidth of amplification. In general, the line width or bandwidth will be that range over which the condition for $\bar{k}$ matching between the idler, pump, and signal approximately holds (the half-power bandwidth is determined approximately by the condition that $\Delta kL \cong \pi$, where $L$ is the length of the nonlinear crystal). Observed line widths typically found have been between about 30 to 100 wave numbers although some have been observed as small as a few wave numbers. There are, however, many situations in which it is desirable to obtain an output limited to extremely well-defined ranges, usually small, as, for example, a 10th to 100th of a wave number wide. Such situations include optical pumping and experimentation in which only light of a very narrow band will be absorbed by the sensitive element, as in certain photon assisted chemical reactions.

A general object of the present invention is to provide a frequency stabilization method and apparatus for parametric amplifiers and oscillators in which a highly controlled, very well-defined bandwidth or line width is obtained.

It is a further object of the invention to provide a method and apparatus of the above character in which the line width is limited to a range about as wide as that of the atomic absorption line of a gas.

It is a further object of the invention to provide a method and apparatus of the above character, the output of which is locked in frequency to the absorption frequency of a given medium.

The above objects are achieved by utilizing a technique in which two nonlinear elements are arranged in such a manner that their effect on an incoming pump radiation is opposite to each other. Then, for frequencies and matched $k$ vectors satisfying the parametric relations $\omega_p = \omega_i + \omega_s$ and $\bar{k}_p = \bar{k}_i + \bar{k}_s$, the pump radiation in passing the first nonlinear element generates signal and idler radiations which, if nothing more were done, decay in the second element to recreate the pump. Between the output of the first nonlinear element and the second nonlinear element there is disposed means for selectively modifying the characteristics of a predetermined frequency band within the signal radiations so that cancellation of gain within the bank, S, in the second element is prevented. It is found that a strong peak in the gain of the combined system is obtained for the predetermined band of frequencies. In one practical arrangement utilizing the invention, the means for modifying the characteristics of a predetermined frequency band consists of a chamber containing a gas having a narrow absorption line centered on the signal frequency band of interest. In addition, reflectors are employed for forming a resonator at the idler or signal frequency to thereby obtain oscillation of the system. Due to the strongly enhanced gain at the frequency absorbed by the gas, the output of the oscillator is stabilized and locked over the frequency band or line width of absorption of the gas.

These and other objects and features of the invention will become apparent from the following description when taken in conjunction with the accompanying drawings and claims.

Figure 1:
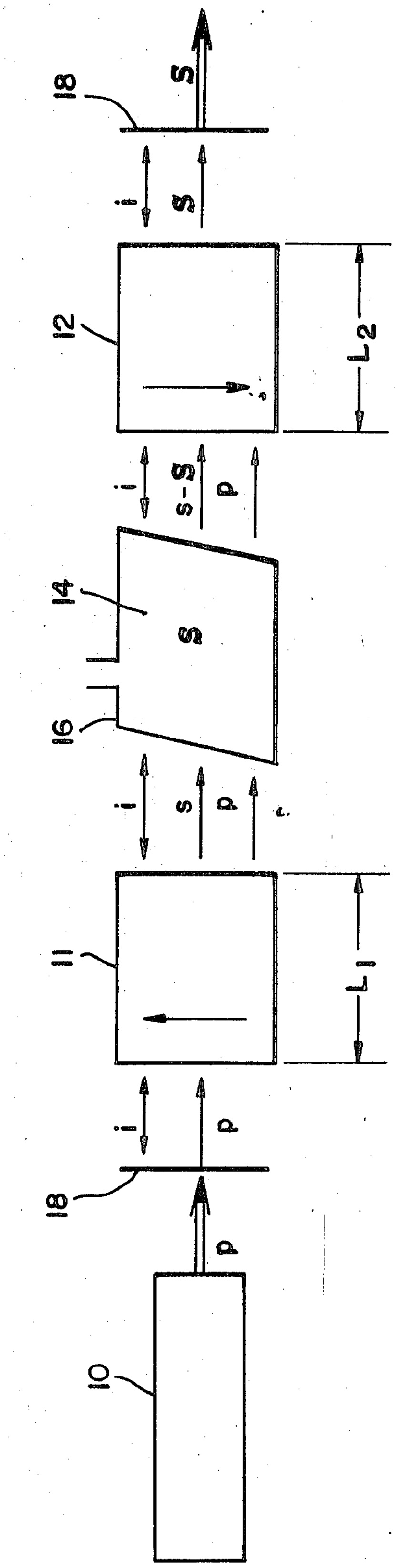
FIG. 1 is a schematic diagram of apparatus constructed in accordance with the present invention.

Referring particularly to FIG. 1, the basic configuration of the apparatus of the present invention is shown. The apparatus includes means forming a source 10 of coherent pump radiation ($p$), usually a laser having a coherent output beam.

The output beam or portions thereof are passed in series through a pair of nonlinear elements 11, 12 which replace the usual signal nonlinear element of a parametric amplifier or oscillator. The nonlinear elements for use at visible light frequencies are usually in the form of nonlinear crystals. The first nonlinear element 11 or crystal develops gain at signal ($s$) and idler ($i$) radiations for which the relations between the frequencies and $k$ vectors of the pump, signal and idler radiations as expressed in equations (1) and (2) hold.

The signal, idler and pump radiations become the output of the first nonlinear element 11 and pass at least in part to the second nonlinear element 12 which can be a nonlinear crystal of the same type as the first but having an operative orientation thereof reversed with respect to the first such that the gain of the first nonlinear element is at least in part cancelled. Such an orientation, for example, with 90° cut $LiNbO_3$ crystals, would call for a reversal of the positive end of the Z-axis i.e., that end of the Z-axis which becomes negative upon compression in the Z-direction.

Means is disposed for receiving the output of the first nonlinear element and for selectively modifying the characteristics of a predetermined frequency band (S) within the signal radiations of the output so that cancellation of gain over the predetermined band S in the second element is prevented. Such means can, for example, consist of a gas 14 having an absorption line to which it is desired to lock the output of the entire apparatus. Such a gas is contained within a suitable cell 16 through which the radiation passes. The pressure within the cell is controlled to obtain satisfactory absorption.

Many practical devices can be based upon the above general arrangement. Other ways to modify the characteristics include the use of a frequency selective device, such as a stop band filter or etalon, a phase shifter or some combination of these means with themselves or with an absorptive medium. If the selected frequency band S is properly shifted in phase, that portion will not be cancelled, but instead will be amplified in accordance with the following analysis.

After modification by absorbing the predetermined frequency band S, the modified signal radiation, together with the pump and idler radiations, enter the second crystal. It is found that a sharp peak in the gain of the overall system occurs for the frequencies within the selected frequency band S. For a one-pass selective amplifier, the elements recited are sufficient. However, the most immediate practical application would appear to be as an oscillating device for which reason the nonlinear elements 11, 12 and modifying means are contained within an optical resonator 18 effective at the mode frequencies of the idler or signal radiations.

An analysis of the operation of the oscillator is as follows. First consider the case where the two nonlinear crystals 11, 12 are of equal length, and the absorbing gas is removed. At the center of the parametric line width, defined by the phase matched condition $\Delta k=0$, the parametric gain of the first crystal will be exactly cancelled by the second crystal. That is to say, as a result of the reversal of the +Z-axes of the two crystals, the relative phases of the signal, idler, and pump on entering the second crystal are such that instead of further growth, the signal and idler decay to the values which they had on entering the first crystal. Since relative phases are involved, the physical spacing between the two crystals is not of consequence. Suppose now that the absorbing gas is inserted into the gas cell and the pressure adjusted such that the gas is nearly opaque at the pertinent transition. The signal generated in the first crystal is now absorbed by the gas, and therefore cancellation of gain no longer occurs in the second crystal. The result is a sharply peaked gain function centered at the frequency of the atomic transition. It will be shown that the peak height of this gain function is between 50–100 percent of the gain which would exist if the +Z-axes of the two crystals were aligned instead of opposed. It will also be shown that it will be of advantage to make the second crystal a number of times longer than the first.

Let the gas have a loss $\alpha(\omega)$ and phase shift $\phi(\omega)$ such that the signal frequency E field at its output is related to that at its input by $\exp-[\alpha(\omega)+j\phi(\omega)]$; and assume the gas to be completely transparent at the idler frequency. Let the first nonlinear crystal have length $L_1$ and the second have length $L_2$. The magnitude of the parametric gain at the idler frequency for a single pass through the two reversed crystals separated by the gas cell is given by $$\left|\frac{E_{i2}}{E_{i0}}\right|^2=\left|\left(\cosh sL_1+\frac{j\Delta k}{2s}\sinh sL_1\right)\left(\cosh sL_2+\frac{j\Delta k}{2s}\sinh sL_2\right)-\exp-\alpha(\omega)\exp j\phi(\omega)\frac{\Gamma^2}{s^2}\sinh sL_1\sinh sL_2\right|^2 \quad (4)$$

where $$s=\left(\Gamma^2-\frac{\Delta k^2}{4}\right)^{1/2}$$

The wave vector mismatch $\Delta k=k_p-k_s-k_i$ is zero at the center of the parametric gain curve and may be written $\Delta k=b\,\Delta\omega_s$ where $\Delta\omega_s$ is the excursion from line center of the signal frequency. For $LiNbO_3$ phase matched at 6,328 A. for example, the constant $b=6.2\times10^{-10}$ sec./m.[10] $\Gamma^2$ is the parametric gain constant and is dependent on the strength of the pump. To obtain equation (3), pump depletion was neglected and thus $\Gamma$ was taken to be the same in both crystals. For 90° phase matching in $LiNbO_3$ with $\lambda_s\cong\lambda_i\cong1\mu$, $\Gamma^2\cong0.1P_p/A$ where $A$ is the area of the pumping bean and $P_p/A$ has units of $MW/cm^2$.

Figure 2A:
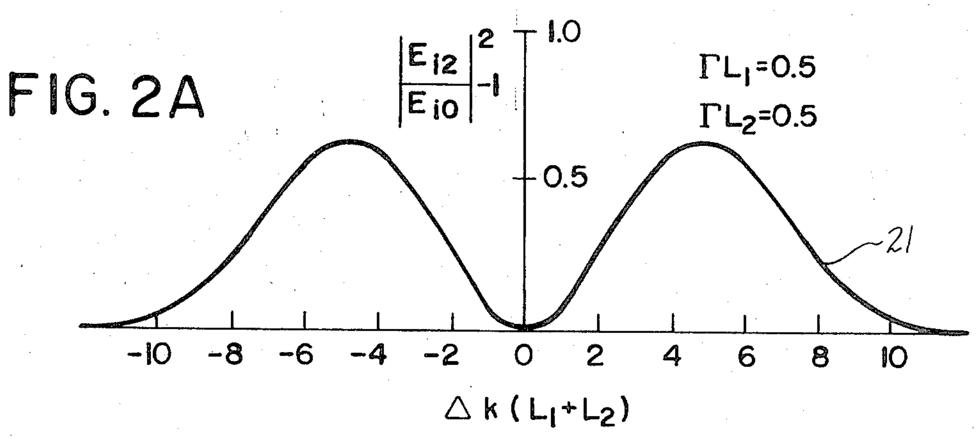
FIGS. 2A, 2B and 2C are sample graphs of computed incremental power gain for arrangements of apparatus constructed in accordance with the present invention before selective modification of the desired frequency band of the signal radiation.
Figure 2B:
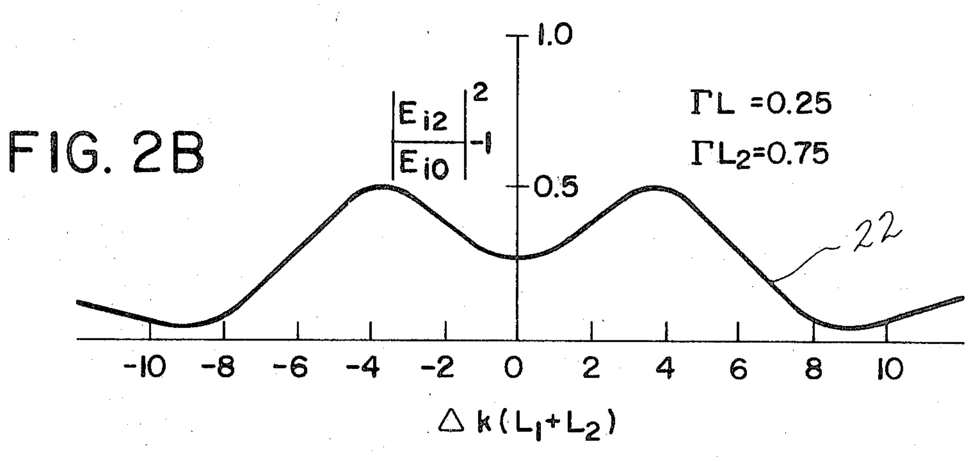
Figure 2C:
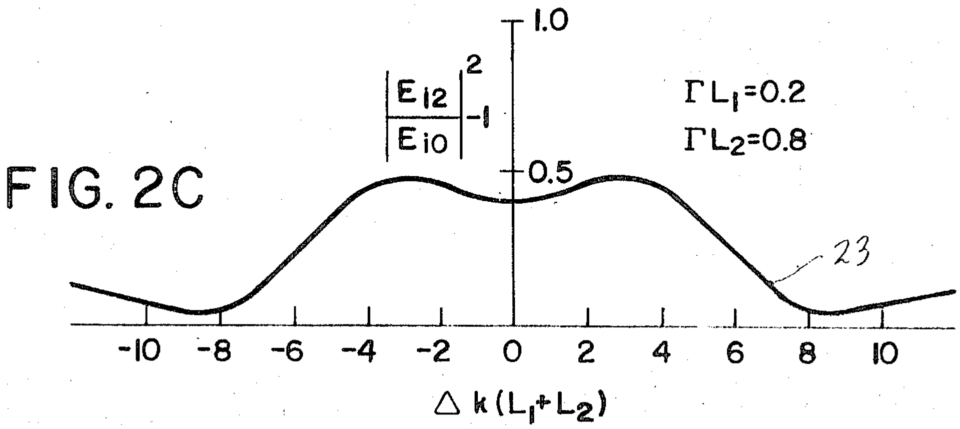

The shape of the parametric gain curve is predicted by equation (4) in the absence of the absorbing gas, i.e., with $\alpha(\omega)=\phi(\omega)=0$. FIGS. 2A through 2C show the incremental power gain functions 21, 22, 23 $|E_{i2}/E_{i0}|^2-1$ plotted versus $\Delta k(L=L_2)$, for three cases where $\Gamma L_1=0.5$, $\Gamma L_2=o0.5$, $\Gamma L_1=0.25$, $\Gamma L_2=0.75$; and $\Gamma L_1=0.2$, $\Gamma L_2=0.8$, respectively. For the case of two crystals of equal length, the gain function 21 is zero at line center and rises off line center. Crystals of differing length (note that the sum of the lengths is held constant) increase the gain at line center and reduce the ripple.

Next, consider the gain in the presence of the absorptive gas. Assume that the line width of the absorbing transition is many times smaller than that of the parametric gain, and that the temperature of the nonlinear crystals have been adjusted such that their parametric line widths center at approximately the atomic transition. For such cases Δk may be taken equal to zero in the vicinity of the atomic transition, and equation (4) gives $$|E_{i2}{}^2/E_{i0}|=|\cos h\,\Gamma L_1\cos h\,\Gamma L_2-\exp-\alpha(\omega)\exp j\phi(\omega)\sin h\,\Gamma L_1\sin h\,\Gamma L_2|^2 \quad 5.$$

Figure 3A:
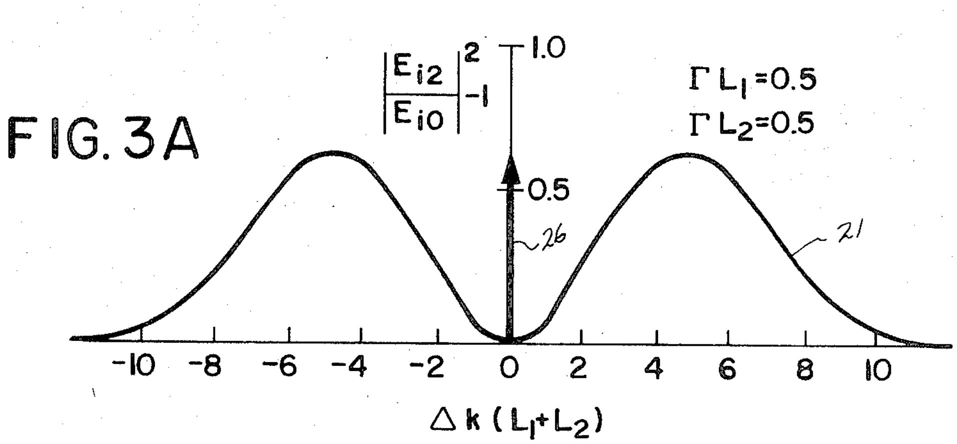
FIGS. 3A, 3B and 3C are sample graphs of computed incremental power gain for arrangements of apparatus constructed in accordance with the invention after selective modification of the desired frequency band of the signal radiation.
Figure 3B:
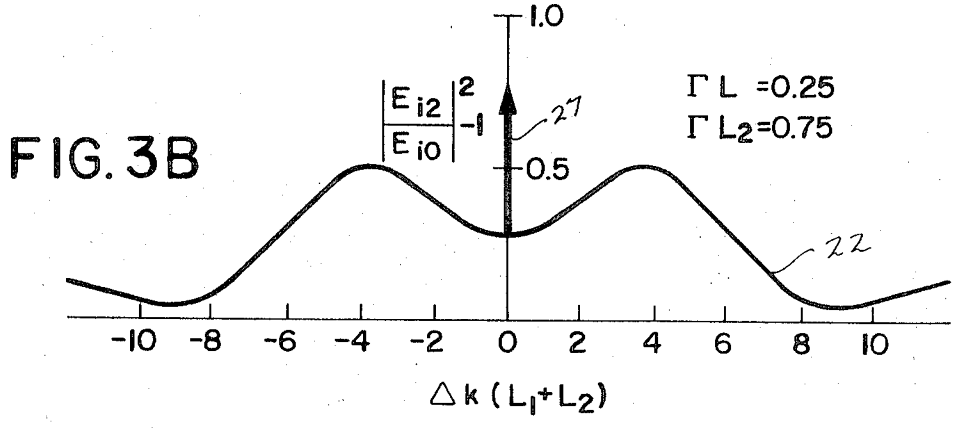
Figure 3C:
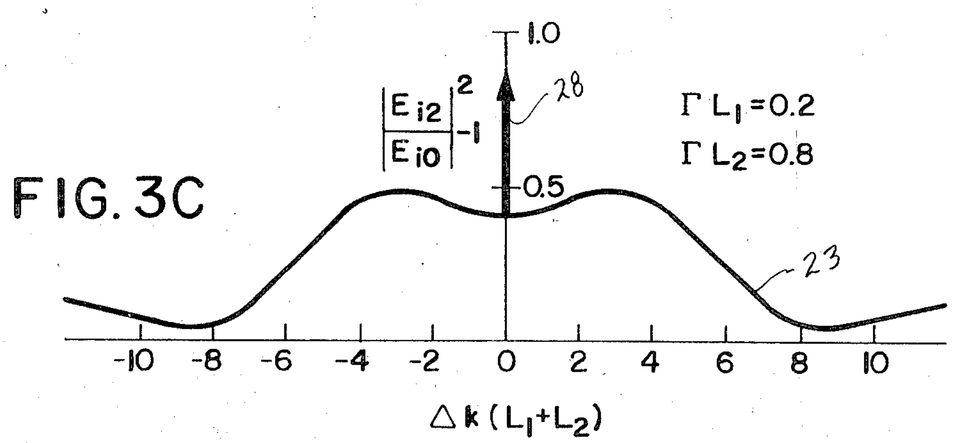

For large $\alpha(\omega)$, i.e., for a nearly opaque gas, $|E_{i2}/E_{i0}|^2=\cos h2\Gamma L_1\cos h2\Gamma L_2$. This gain can be plotted as a delta-function at $\Delta k=0$ for each of the three cases 26, 27, 28 and is superimposed upon the gain functions 21, 22, 23 as shown in FIGS. 3A, 3B, 3C. For the case of a four to one ratio of crystal lengths, i.e., $\Gamma L_1=0.2$, $\Gamma L_2=0.8$, the ratio of gain at the atomic transition to the maximum parametric gain which occurs elsewhere on the line is about 1.8. This provides a more optimum condition for operation. Choosing the second crystal longer than the first (as in FIGS. 3B and 3C) has the additional advantage that the signal power entering the gas from the first crystal varies as $L_1{}^1$, and thus the possibility of saturating the gas is reduced.

The detailed shape of the parametric gain in the vicinity of the transition is determined by the relation of $\alpha(\omega)$ to $\phi(\omega)$. For an ideal Lorentzian line $\phi(\omega)/\alpha(\omega)$ is proportional to the detuning from the atomic line center. For small $\alpha(\omega)$, the peak parametric gain occurs at the center of the atomic line. However, for larger $\alpha(\omega)$, e.g., higher pressure or longer cell length, higher gain results toward the wings of the atomic line where the ratio of $\phi(\omega)$ to $\alpha(\omega)$ is larger. (Note that the most favorable case for equation (5) is $\alpha(\omega)=0$, $\phi(\omega)=\pi$.) In this case the gain becomes double peaked, dipping at the center frequency of the atomic transition. As a result of this phase contribution of the atomic line, the peak gain may exceed the height of the delta-functions shown in FIG. 3, and the width of the gain function may be a few times wider than that of the atomic transition. It should perhaps be noted that the effect of a pure $\pi$ phase shift is equivalent to removing the reversal of the second crystal; and thus to restoring the full gain which would be present had the positive axes of the two crystals been aligned. As noted above, it is, however, not possible to get a pure phase shift in an ideal gas, since the phase shift is explicitly tied to the absorption loss of the atomic resonance line. However, on the wings of the line a situation where the phase shift is the dominant contribution of the atomic line, may be approached.

In constructing an oscillator of the type described here, it may be desirable to make the $c/2L$ frequency spacing of the idler modes less than the width of the atomic transition. Even though the pump frequency is randomly fluctuating, there would then always be at least one idler mode such that the difference between the pump frequency and its frequency falls within the width of the atomic transition.

By way of a specific example, the following illustrates a possible application of the present invention to a practical parametric oscillator: pump source—laser output at 4,730 A.; nonlinear crystals 11, 12—$LiNbO_3$, length (crystal 11)/length (crystal 12) ≅ 4; absorbent medium—sodium vapor—absorptive at approximately 5,890 A.; resonator effective at idler radiation and transparent to signal and pump; and output (S)—5,890 A. frequency stabilized to sodium absorption line.

In the foregoing discussion, the terms signal and idler have been used to denote the two radiations generated in the nonlinear crystal. It will be understood that this terminology is arbitrary and that the terms signal and idler can be simply interchanged without any corresponding change in the physical principles of the apparatus of the present invention. Additionally, while the stabilization provided by the present invention is ideally approximate to the line width of the modifying element, it is to be understood that it can be several times wider in practice.

I claim:

1. Frequency stabilized parametric apparatus comprising means forming a source of coherent pump radiation ($p$), means forming a first nonlinear element coupled to said source for receiving pump radiation and for developing gain at signal ($s$) and idler ($i$) radiations for which the following relations between the frequencies and $k$ vectors of the pump, signal, and idler radiations hold, $\omega_p=\omega_i+\omega_s$ and $\bar{k}_p\cong\bar{k}_i+\bar{k}_s$, said signal, idler, and pump radiations becoming the output of said first nonlinear element, means forming a second nonlinear element, said first and second nonlinear elements being constructed and arranged such that the effect of passage of the pump radiation through one in developing gain at signal and idler radiations normally is at least partially cancelled in the second element, and means disposed for receiving the output of the first nonlinear element and for selectively modifying the characteristics of a predetermined frequency band, S, within said signal radiations so that gain cancellation of said predetermined band in said second element is prevented, a resonator coupled across said first and second nonlinear elements and operative at one of said idler or signal frequencies, whereby a peak in the gain of the combined elements is obtained for said predetermined frequency band.

2. Apparatus as in claim 1 in which said pump radiation and said signal radiation are in the visible region of the spectrum and in which said source comprises a laser.

3. Apparatus as in claim 1 wherein said means for modifying the characteristics of said signal radiation includes a gas capable of shifting the phase of said selected frequency band so that cancellation in said second nonlinear element does not take place.

4. Apparatus as in claim 1 wherein said means for modifying the characteristics of said signal radiation includes gas having an absorption line at said frequency band S.

5. In frequency stabilized parametric apparatus, means adapted to receive a beam of coherent pump radiation, means forming a first nonlinear element coupled to said beam for receiving the pump radiation and for developing gain at signal ($s$) and idler ($i$) radiations for which the following relations between the frequencies and k vectors of the pump, signal and idler radiations hold: $\omega_p=\omega_i+\omega_s$ and $\bar{k}_p=\bar{k}_i=\bar{k}_s$, said signal, idler and pump radiations becoming the output of said first nonlinear element, means forming a second nonlinear element, said first and second nonlinear elements being constructed and arranged such that the effect of passage of the pump radiation through the first element in developing gain at signal and idler radiations normally is at least partially cancelled in the second element, and means disposed in the radiation path between said first and second nonlinear elements and adapted to selectively modify the characteristics of a predetermined frequency band (S) within said signal radiation so that cancellation of said predetermined band in said second element is prevented a resonator coupled across said nonlinear elements said resonator being operative at the frequency of either the idler or the signal radiation, whereby the overall gain of the combined nonlinear elements and modifying means attains a peak at said predetermined frequency (S).

6. A method for obtaining a frequency stabilized output from a coherent radiation source comprising the steps of passing the output of said source through a first nonlinear element to generate gain at signal and idler radiations satisfying the relations $\omega_p=\omega_i+\omega_s$ and $\bar{k}_p=\bar{k}_i=\bar{k}_s$, modifying a selected frequency band (S) within the signal radiations, passing the source radiation and idler radiation together with a modified signal radiation through a second nonlinear element wherein the signal and idler radiations normally tend to recreate the pump radiation by reversal of the mechanism of the first nonlinear element, said modifying step being effected to cause the development of a peak in the overall gain as said first and second nonlinear elements for said predetermined frequency band (S).

7. A method as in claim 6 in which said step of modifying said signal radiations includes absorbing said radiations.

8. A method as in claim 6 in which said modifying step includes shifting the phase of said selected frequency band so that cancellation in said second nonlinear element does not take place.

* * * * *